(12) United States Patent
Movsisyan et al.

(10) Patent No.: US 10,185,613 B2
(45) Date of Patent: Jan. 22, 2019

(54) ERROR DETERMINATION FROM LOGS

(71) Applicant: VMware, Inc., Palo Alto, CA (US)

(72) Inventors: Vardan Movsisyan, Yerevan (AM); Hovhannes Bolibekyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 92 days.

(21) Appl. No.: 15/142,893

(22) Filed: Apr. 29, 2016

(65) Prior Publication Data
US 2017/0315854 A1 Nov. 2, 2017

(51) Int. Cl.
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0787* (2013.01)

(58) Field of Classification Search
CPC . G06F 11/079; G06F 11/0751; G06F 11/0787
USPC .......................................................... 714/37
See application file for complete search history.

(56) References Cited

U.S. PATENT DOCUMENTS

| | | | | |
|---|---|---|---|---|
| 3,219,807 A | * | 11/1965 | Zeheb | G06F 11/1032 714/805 |
| 5,450,586 A | * | 9/1995 | Kuzara | G06F 11/3466 714/1 |
| 7,653,633 B2 | | 1/2010 | Villella et al. | |
| 7,774,790 B1 | * | 8/2010 | Jirman | G06F 11/3419 719/318 |
| 2004/0017399 A1 | * | 1/2004 | Beck | G01R 13/0245 715/805 |
| 2007/0124437 A1 | * | 5/2007 | Chervets | H04L 41/0681 709/223 |
| 2007/0283194 A1 | * | 12/2007 | Villella | G06F 11/3476 714/57 |
| 2009/0013007 A1 | | 1/2009 | Caner et al. | |
| 2010/0223491 A1 | * | 9/2010 | Ladd | G06F 11/2268 714/2 |
| 2011/0201324 A1 | * | 8/2011 | Persson | H04W 24/10 455/422.1 |
| 2012/0005542 A1 | * | 1/2012 | Petersen | G06F 11/0709 714/48 |
| 2012/0182939 A1 | * | 7/2012 | Rajan | A61B 5/0008 370/328 |
| 2013/0067288 A1 | * | 3/2013 | Louie | G06F 11/0709 714/48 |
| 2014/0089354 A1 | * | 3/2014 | Gonsalves | H04M 3/2218 707/812 |

OTHER PUBLICATIONS

Author Unknown, VMware Identity Manager Integration with Active Directory Federation Services 2.0, VMware, Inc., https://www.vmware.com/pdf/vidm-adfs-integration.pdf (Jul. 2015 V2).

* cited by examiner

*Primary Examiner* — Kamini B Patel

(57) ABSTRACT

The present disclosure is related to devices, systems, and methods for determining errors from logs. An example device can include instructions to analyze a log of a log source, determine an error in the log, the error resulting from a user action with respect to the log source, and provide a portion of the log associated with the error to a user interface.

18 Claims, 5 Drawing Sheets

ERROR DETERMINATION FROM LOGS

BACKGROUND

An error, caused by the occurrence of an unexpected condition, may follow one or more actions. In some instances, actions can be initiated at a user interface. In some instances, actions can be scheduled actions. Some errors may be fatal, some may be non-fatal. Some errors may be syntactically correct but may be logically incorrect.

DETAILED DESCRIPTION

Figure 1A:
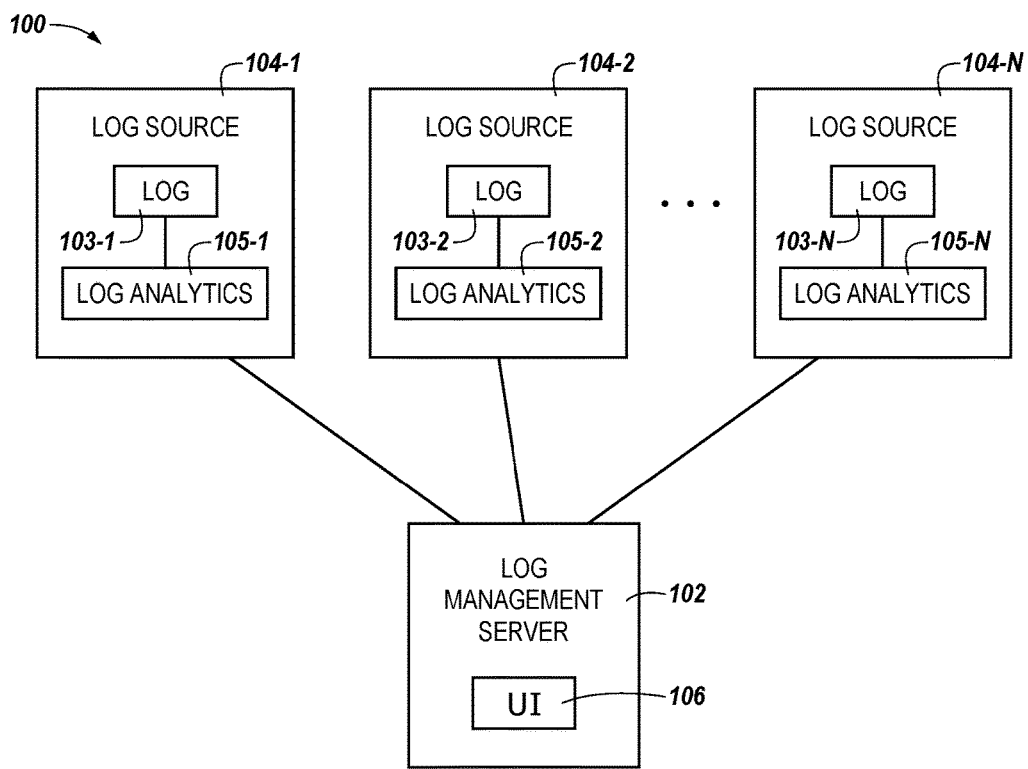
FIG. 1A is a general logical diagram of an infrastructure for error determination from logs according to the present disclosure.

A log source, as used herein, refers to a source of one or more system logs (e.g., event and/or status logs). In general, a log source can refer to any entity capable of generating logs. For instance, a log source can be a server (e.g., a physical server), a virtual computing instance, an application, a host, a network device, a desktop computing device, an event channel, a log aggregator, a log file, etc.

Logs can reflect actions. Actions can be user-initiated at a user interface (UI). Actions can be scheduled actions, such as backups and/or alerts. User actions can include configuration of devices and/or states, for instance. In some embodiments, the UI may be a UI associated with a log management server that monitors logs of, and/or configures, one or more log sources. In some embodiments, the UI may be a UI of an application.

Logs may include error messages, which can be indicative of errors. Actions may be followed by an error. The error may be a direct or indirect result of the action. In some instances, actions which have long-running asynchronous operations may be deemed acceptable by the UI, but may fail (or partially fail) later. In some instances, user actions can set a correct and verified state, but may be impacted by future events which render them ultimately incorrect. In some instances, actions can have complex scenarios involving multiple steps, resulting in an overall acceptable success level, but one or more failed intermediate steps nonetheless.

Embodiments of the present disclosure can include instructions (e.g., application logic) associated with a log source to analyze the log source's own log to determine one or more error messages (sometimes referred to herein as "errors") in the log. Once determined, an error can be provided to a user interface in a relevant, meaningful context. In some embodiments, the error can be provided via a UI of the log source itself. In some embodiments, the error can be provided to a log management server (e.g., a UI of a log management server). Embodiments herein can alert users to errors that are non-fatal in addition to those that are fatal.

For example, when an action is taken with respect to a log source, embodiments of the present disclosure can set a marker (e.g., a "bookmark") indicating the action into a log of the log source before the action. In some embodiments, a marker can be placed in an application's own memory. Then, if the action subsequently fails, a relevant error can be found in the log after the marker. Embodiments herein can analyze logs for these errors and provide a notification to a UI associated with the error. Embodiments herein can "remember" a line number of a last error and associated content, then parse text afterward. In some embodiments, all log data occurring after the marker can be extracted and provided. In some embodiments, a portion of the log data (e.g., the error message(s)) can be provided.

In infrastructures having a log management server, the ability provided by embodiments herein for log sources (e.g., agents of log sources) to analyze their own logs for errors represents an increase in efficiency over the log management server performing the analysis. For example, a log management server may allow saving agent configurations that do not contain syntax errors, but it may be inefficient for that log management server to check perhaps hundreds of connected agent configurations (e.g., configured filesystem paths) for logical errors.

When errors are determined, notifications containing some or all log data (e.g., a remainder of log data) subsequent to a marker preceding an action can be provided to the log management server UI. Notifications can be provided in relevant places, such as aggregated errors pages and/or agent configuration pages, among others. Errors can be provided in one or more banners and/or messages (e.g., emails), for instance.

As referred to herein, the term "log source" can refer to a virtual computing instance (VCI), which covers a range of computing functionality. VCIs may include non-virtualized physical hosts, virtual machines (VMs), and/or containers. A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others. VMs, in some embodiments, operate with their own guest operating systems on a host using resources of the host virtualized by virtualization software (e.g., a hypervisor, virtual machine monitor, etc.).

Multiple VCIs can be configured to be in communication with each other in a software defined data center. In such a system, information can be propagated from an end user to at least one of the VCIs in the system, between VCIs in the system, and/or between at least one of the VCIs in the system and a management server. In some embodiments, the management server can be provided as a VCI. Software defined data centers are dynamic in nature. For example, VCIs and/or various application services, may be created, used, moved, or destroyed within the software defined data center. When VCIs are created, various processes and/or services start running and consuming resources. As used herein, "resources" are physical or virtual components that have a finite availability within a computer or software defined data center. For example, resources include processing resources, memory resources, electrical power, and/or input/output resources.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. A group or plurality of similar elements or components may generally be referred to herein with a single element number. For example a plurality of reference elements 104-1, 104-2, . . . , 104-N may be referred to generally as 104. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1A is a general logical diagram of an infrastructure for error determination from logs according to the present disclosure. For example, FIG. 1 can be a diagram of a system 100 for error determination from logs according to the present disclosure. It is noted that embodiments of the present disclosure are not limited to the infrastructure illustrated in FIG. 1. Some embodiments, for instance, do not include a log management server such as that shown in FIG. 1.

The system 100 can include a log management server 102 in communication with a number of log sources 104-1, 104-2, . . . , 104-N (referred to generally herein as "log sources 104"). The log management server can include a UI 106. The log management server 102 and the number of log sources 104 are described in greater detail below in the description associated with FIG. 2 (respectively referred to therein as "log management server 202" and "log sources 204").

In some embodiments, the log sources 104 can provide a same functionality. In some embodiments, the log sources 104 can provide different functionalities. For example, one or more of the log sources 104 can provide email functionality. In some embodiments, one or more of the log sources 104 are configured to selectively permit client login. In some embodiments, one or more of the log sources 104 are email log sources. In some embodiments, one or more of the log sources 104 are application log sources. In a number of embodiments, one or more of the log sources 104 can be servers, such as files servers, print servers, communication servers (such as email, remote access, firewall, etc.), application servers, database servers, web servers, and others. Embodiments herein are not intended to limit the log sources 104 to a particular type and/or functionality.

The log sources 104 can each record and/or maintain a respective event log (herein referred to as a "log") which tracks events (e.g., actions, and/or activities) taking place on the respective log source. For instance, the log source 104-1 can record a log 105-1; the log source 104-2 can record a log 105-2; and the log source 104-N can record a log 105-N (cumulatively referred to herein as "logs 105"). Events in the logs 105 can be accompanied by event information. Event information included in each of the logs 105 can include, for instance, a timestamp of an event, a source of the event (e.g., a particular UI), text associated with the event, and/or a name-value pair extracted from the event. The logs 105 can be recorded in real time, for instance. In some embodiments, the logs 105 can detail log source interaction with the log management server 102 (e.g., the UI 106), for instance. In some embodiments, the logs 105 can track aspects of a number of applications and/or programs. In some embodiments, the logs 105 can track physical and/or virtual hardware usage.

Each log source 104 can have an agent (discussed in more detail below in connection with FIG. 2). In some embodiments the agent can employ (e.g., execute) a log analytics functionality. As shown in FIG. 1A, the log sources 104 each include a respective log analytics functionality. For instance, the log source 104-1 includes log analytics 105-1; the log source 104-2 includes log analytics 105-2; and the log source 104-N includes log analytics 105-N (cumulatively referred to herein as "log analytics 105").

Each of the log analytics 105 can analyze a respective log of an associated log source 104. For example, the log analytics 105-1 can analyze the log 103-1; the log analytics 105-2 can analyze the log 103-2; and the log analytics 105-N can analyze the log 103-N. The log analytics of a log source can allow the log source to analyze its own log and determine whether an error is present in the log (e.g., whether an action failed). In some embodiments, analyzing the log to determine errors can include determining keyword errors. In some embodiments, analyzing the log can include determining exceptions (e.g., fatal exceptions) in the log. In some embodiments, errors determined are non-fatal errors.

In some embodiments, a log is analyzed responsive to a failure of an action. An action can fail, for example, if it times out, a connection is lost, or if it is logically incorrect. When an action fails on the log source 104-1, for instance, the log analytics 105-1 can analyze the log 103-1 for error messages occurring after a marker associated with the action. The log analytics 105-1 can then provide a notification (e.g., via an application programming interface (API) call) to the UI 106 associated with the error. The notification can be displayed in one or more relevant places, such as aggregated errors pages and/or agent configuration pages, among others. Errors can be provided in one or more banners and/or messages (e.g., emails), for instance.

Embodiments of the present disclosure can determine configuration errors. For example, the log sources 104 (e.g., thousands of log sources) can request instructions from the log management server 102 (e.g., update agent configuration). The log sources 104 can set a marker for their own logs 103 and update their own configurations. If the action fails in the log source 104-1, for instance, the log analytics 105-1 can analyze a portion of the log after the marker, extract one or more relevant error messages (e.g., non-fatal error messages) after the marker, and provide those messages to the log management server 102 (e.g., via an API call).

A configuration can be free of syntax errors, but can fail, for instance, for being logically incorrect with respect to one or more of the log sources 104. Because it may not be efficient for the log management server 102 to check the configurations of all the log sources 104 for configuration correctness (e.g., configured filesystem paths reflecting reality of the log sources 104), the respective agent of each log source can analyze its own log.

In some embodiments a change can be logically correct for a first subset of the log sources 104, but logically incorrect for a second subset of the log sources 104, thereby causing a non-fatal error for the second subset. The error can be corrected, for instance, by distributing a second change to the second subset of the plurality of log sources that is logically correct for the second subset.

In some embodiments, a correct and/or verified state set by the UI 106 can be impacted by one or more future events such that the state becomes incorrect. In previous approaches, the incorrect state may go unnoticed as it is understood to be correct by the UI 106. According to the present disclosure, however, analysis of the log can determine the error.

For example, if the log source 104-1 is a Network File System (NFS) server integrated for archiving, it may at some point become full, unresponsive, or otherwise not perform as desired. Log analytics 105 can aggregate error messages for NFS (including text not addressed in code paths) and provide those error messages in an NFS page of the UI 106, for instance.

In another example, if the log source 104-2 is an identity manager (e.g., Identity as a Service (IDaaS) providing application provisioning, self-service catalog, conditional access controls, etc.) and/or directory-based identity-related services (e.g., Active Directory® (AD), the log source 104-2 may use one or more connector accounts and/or certificates to encrypt files, emails, traffic, etc. In some cases, integration between the log source 104-2 and the log management server 102 can function beyond a certificate's expiration period and/or needs to function irrespective of connector account-related issues. The log analytics 105-2 can aggregate logged connector account-related issues or expired certificate messages and provide those error messages in an authentication page of the UI 106, for instance.

In some embodiments, user actions at the UI 106 can involve complex scenarios, which may include multiple steps, resulting in overall acceptable success level(s) but having intermediate failed step(s). In previous approaches, because these errors may be non-fatal in nature, they may not be presented as errors. Log analytics 105 can aggregate errors associated with these intermediate failed steps and provide them to the UI 106 (e.g., below forwarders example).

For example, the log management server 102 may be configured with tags that direct a log source (e.g., log source 104-1) to forward events. "Tags" may enable the addition of fields with predefined values to events for querying, for instance. However, in some instances, a particular tag may be unacceptable for a destination (e.g., because the tag is a reserved keyword) and may be ignored by the destination. Because it was ignored, no error may be detected at the destination. Embodiments of the present disclosure, however, can determine and aggregate such errors and provide them to the UI 106.

In some embodiments the log management server 102 can use an active directory authentication (e.g., Microsoft® AD) via a connector account. When a user attempts to log in to the log source 104-3, for instance, the log analytics 105-3 can set a marker associated with the attempt (e.g., before the attempt in the log). If the login fails due to a problem with the connector account (e.g., locked account, wrong password, etc.), the log analytics 105-3 can extract relevant error message(s) from the log after the marker and provide them to a user. In some embodiments, the error message(s) can be provided in an email.

Figure 1B:
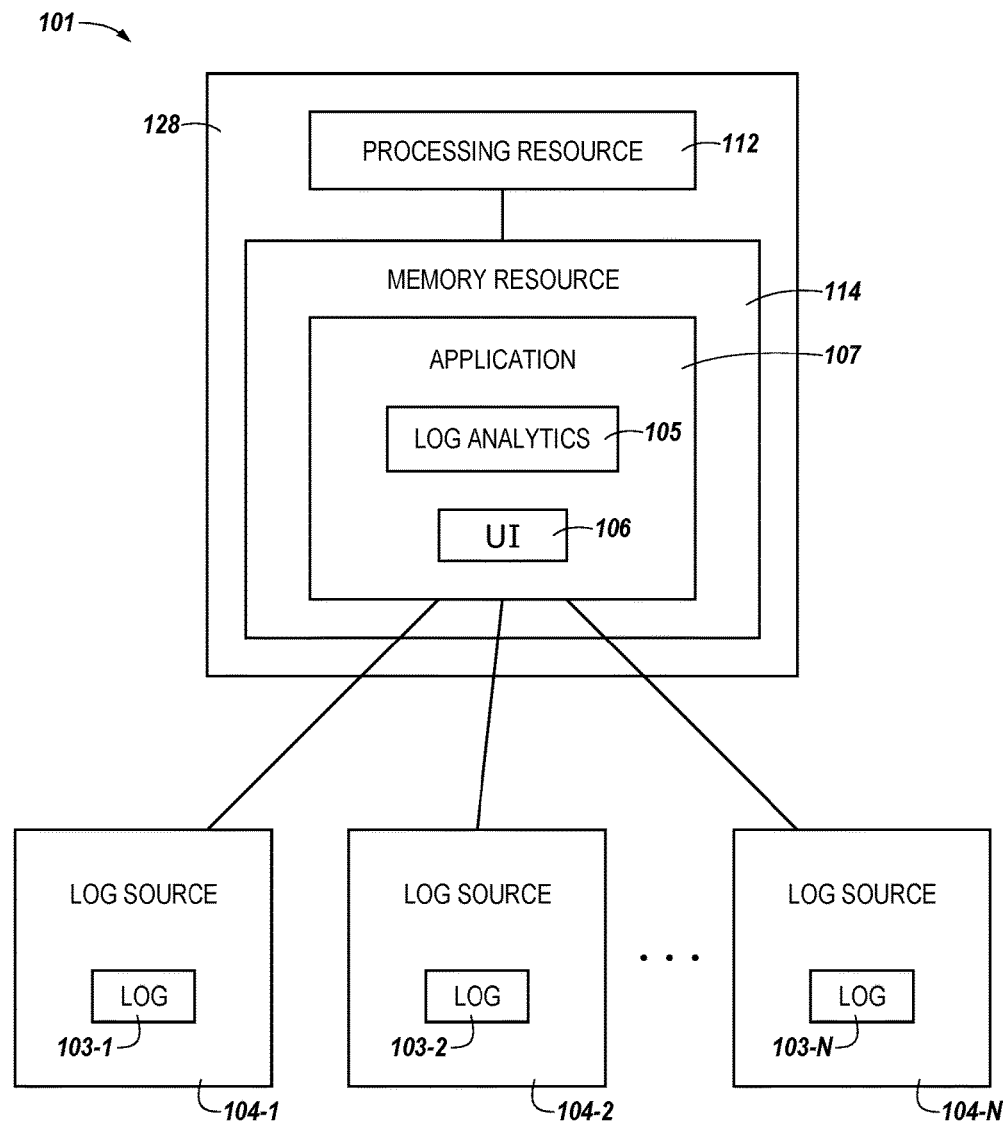
FIG. 1B is a general logical diagram of an infrastructure for error determination from logs according to the present disclosure.

FIG. 1B is a general logical diagram of an infrastructure for error determination from logs according to the present disclosure. For example, FIG. 1B can be a diagram of a system 101 for error determination from logs according to the present disclosure. In a manner analogous to FIG. 1A, the system 101 includes log sources 104 maintaining respective logs 103. In the system 101, the log sources 104 are external entities rather than own logs and/or log sources managed by a log management server.

The system 101 can include a machine 128 including a processing resource 112 in communication with a memory resource 114 (described in more detail below in connection with FIGS. 2 and/or 4). The memory resource 114 can include an application 107 in communication with the log sources 104. The application 107 can include the log analytics 105 and a UI 106.

The application 107 can set a log marker for a log of an external entity (e.g., the log 103-1 of the log source 104-1). Then, the application 107 can call the external entity (e.g., a backup script and/or an API call). If an action fails (e.g., an internal timer of the application 107 times out and/or a connection between the application 107 and the log source 104-1 is lost), relevant error message(s) after the marker and a status of the requested action can be extracted from the log of the external entity (e.g., the log 103-1). The message(s) and the status can be provided in a notification via the UI 106. The notification can indicate that the backup script is continuing properly though the application 107 may have timed out waiting. The notification can indicate that the API-called action should be canceled and/or recalled.

Figure 2:
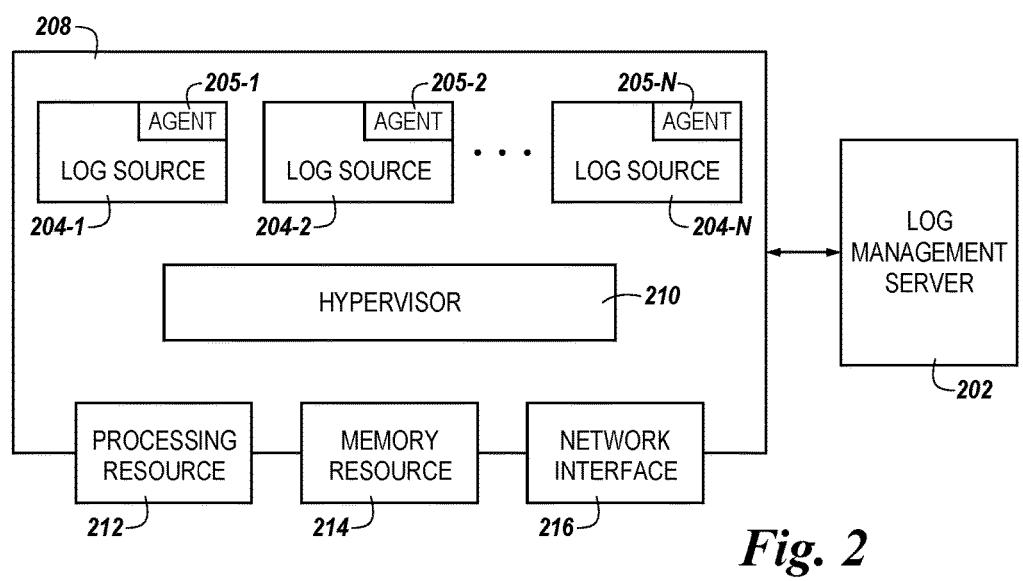
FIG. 2 is a diagram of an example of an infrastructure for error determination from logs according to the present disclosure.

FIG. 2 is a diagram of an example of an infrastructure for error determination from logs according to the present disclosure. For example, FIG. 2 can be a diagram of a host 208 for error determination from logs according to the present disclosure. The host 208 can include processing resources 212 (e.g., a number of processors), memory resources 214, and/or a network interface 216. Memory resources 214 can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media. For example, the memory resources 214 may comprise primary and/or secondary storage.

The host 208 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 208 can incorporate a hypervisor 210 that can execute a number of VCIs 204-1, 204-2, ..., 204-N that can each provide the functionality of a log source. As such, the VCIs may be referred to herein as "log sources." The log sources 204-1, 204-2, ..., 204-N are referred to generally herein as "log sources 204." The log sources 204 can be provisioned with processing resources 212 and/or memory resources 214 and can communicate via the network interface 216. The processing resources 212 and the memory resources 214 provisioned to the servers 204 can be local and/or remote to the host 208. For example, in a software defined data center, the log sources 204 can be provisioned with resources that are generally available to the software defined data center and are not tied to any particular hardware device. By way of example, the memory resources 214 can include volatile and/or non-volatile memory available to the log sources 204. The log sources 204 can be moved to different hosts (not specifically illustrated), such that different hypervisors manage the log sources 204. In some embodiments, a log source among the number of log sources can be a master log source. For example, log sources 204-1 can be a master log sources, and log sources 204-2, ..., 204-N can be slave log sources. In some embodiments, each log sources 204 can include a respective logging agent 205-1, 205-2, ..., 205-N (referred to generally herein as logging agents 205) deployed thereon.

The logging agents 205 can record logs associated with the log sources 204. In some embodiments, the logging agents 205 can communicate (e.g., report) the logs to the log management server 202. In some embodiments, the logging agents 205 can report the logs to the log management server 202 in real time and/or in response to a request. As previously discussed, in some embodiments, the logging agents (e.g., the log analytics of the logging agents, previously described in connection with FIGS. 1A and/or 1B) can analyze logs of their respective log source. In some embodiments, the logging agent 205-1 analyzes logs only of the log source 204-1; the logging agent 205-2 analyzes logs only of the log source 204-2; and the logging agent 205-N analyzes only logs of the log source 204-N. An example of the log analytics of the logging agents (e.g., instructions executed by one or more of the logging agents) is illustrated and described in more detail with respect to FIG. 3.

Figure 3:
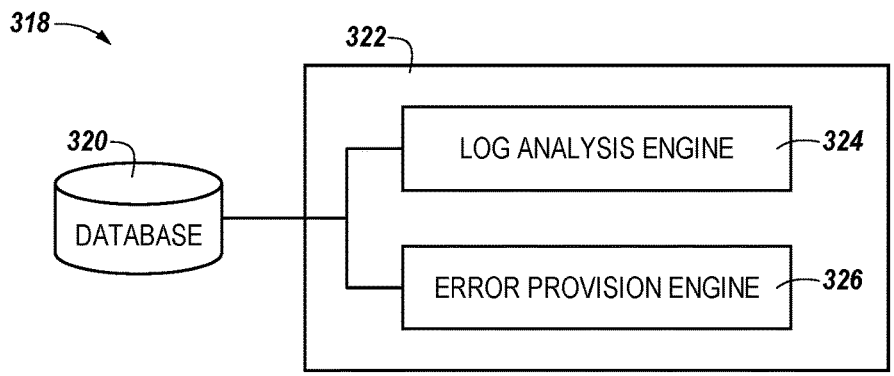
FIG. 3 is a diagram of a general logical system structure implementing error determination from logs according to the present disclosure.

FIG. 3 is a diagram of a general logical system structure implementing error determination from logs according to the present disclosure. For example, FIG. 3 can be a diagram of a system for error determination from logs according to the present disclosure. The system shown in FIG. 3 can be implemented in a log source, for instance, such as the log sources 104, previously discussed. Whereas, the infrastructure(s) illustrated in FIG. 1A may include a log management system, FIG. 3 can illustrate a system implemented on a standalone log source (e.g., an application).

The system 318 can include a database 320, a subsystem 322, and/or a number of engines, for example a log analysis engine 324, and/or an error provision engine 326, and can be in communication with the database 320 via a communication link. The system 318 can include additional or fewer engines than illustrated to perform the various functions described herein. The system 318 can represent program instructions and/or hardware of a machine (e.g., machine 430 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines (e.g., 324, 326) can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the log analysis engine 324 can include a combination of hardware and program instructions that can be configured to analyze a log of a log source, and determine an error in the log, the error resulting from a user action with respect to the log source. User actions resulting in errors can include user actions made using a user interface, for instance. In some embodiments, user actions include configuration of machines, and/or attempts at logging in to a system and/or application. In some embodiments, user actions can include entries of keywords, tags, values, etc. A portion of the log source after a marker associated with the action can be analyzed for errors in some embodiments.

The error provision engine 326 can be configured to provide a portion of the log associated with the error to a user interface. In some embodiments, the error provision can be configured to fetch a portion of a log after the marker including an error. In some embodiments, an entirety of the log after the marker can be provided.

Figure 4:
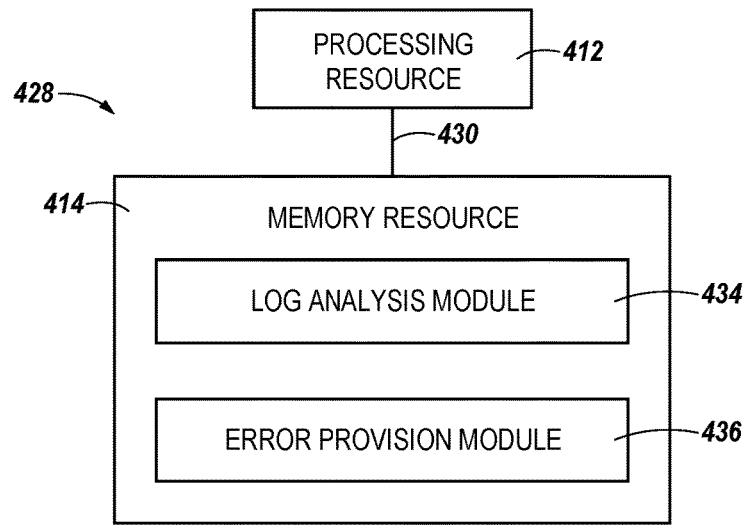
FIG. 4 is a diagram of an example system structure implementing error determination from logs according to the present disclosure.

FIG. 4 is a diagram of an example system structure implementing error determination from logs according to the present disclosure. For example, FIG. 4 can be a diagram of a machine for error determination from logs according to the present disclosure. The machine 428 can utilize software, hardware, firmware, and/or logic to perform a number of functions. The machine 428 can be a combination of hardware and program instructions configured to perform a number of functions (e.g., actions). The hardware, for example, can include a number of processing resources 412 and a number of memory resources 414, such as a machine-readable medium (MRM) or other memory resources 414. The memory resources 414 can be internal and/or external to the machine 428 (e.g., the machine 428 can include internal memory resources and have access to external memory resources). In some embodiments, the machine 428 can be a log analytics functionality of a log source, for example, the machine 428 can be analogous to one or more log analytics of the log sources, previously discussed in connection with FIGS. 1A, 1B, and/or 2. The program instructions (e.g., machine-readable instructions (MM)) can include instructions stored on the MRM to implement a particular function (e.g., an action such as issuing alerts to servers). The set of MRI can be executable by one or more of the processing resources 412. The memory resources 414 can be coupled to the machine 428 in a wired and/or wireless manner. For example, the memory resources 414 can be an internal memory, a portable memory, a portable disk, and/or a memory associated with another resource, e.g., enabling MM to be transferred and/or executed across a network such as the Internet. As used herein, a "module" can include program instructions and/or hardware, but at least includes program instructions.

The memory resources 414 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 412 can be coupled to the memory resources 414 via a communication path 430. The communication path 430 can be local or remote to the machine 428. Examples of a local communication path 430 can include an electronic bus internal to a machine, where the memory resources 414 are in communication with the processing resources 412 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 430 can be such that the memory resources 414 are remote from the processing resources 412, such as in a network connection between the memory resources 414 and the processing resources 412. That is, the communication path 430 can be a network connection. Examples of such a network connection can include a local area network (LAN), wide area network (WAN), personal area network (PAN), and the Internet, among others.

As shown in FIG. 4, the MRI stored in the memory resources 414 can be segmented into a number of modules 434, 436 that when executed by the processing resources 412 can perform a number of functions. As used herein a module includes a set of instructions included to perform a particular task or action. The number of modules 434, 436 can be sub-modules of other modules. For example, the error provision module 436 can be a sub-module of the log analysis module 434 and/or can be contained within a single module. Furthermore, the number of modules 434, 436 can comprise individual modules separate and distinct from one another. Examples are not limited to the specific modules 434, 436 illustrated in FIG. 4.

Each of the number of modules 434, 436 can include program instructions and/or a combination of hardware and program instructions that, when executed by a processing resource 412, can function as a corresponding engine as described with respect to FIG. 3. For example, the log analysis module 434 can include program instructions and/or a combination of hardware and program instructions that, when executed by a processing resource 412, can function as the log analysis engine 324, and/or the error provision module 436 can include program instructions and/or a combination of hardware and program instructions that, when executed by a processing resource 412, can function as the error provision engine 326.

Figure 5:
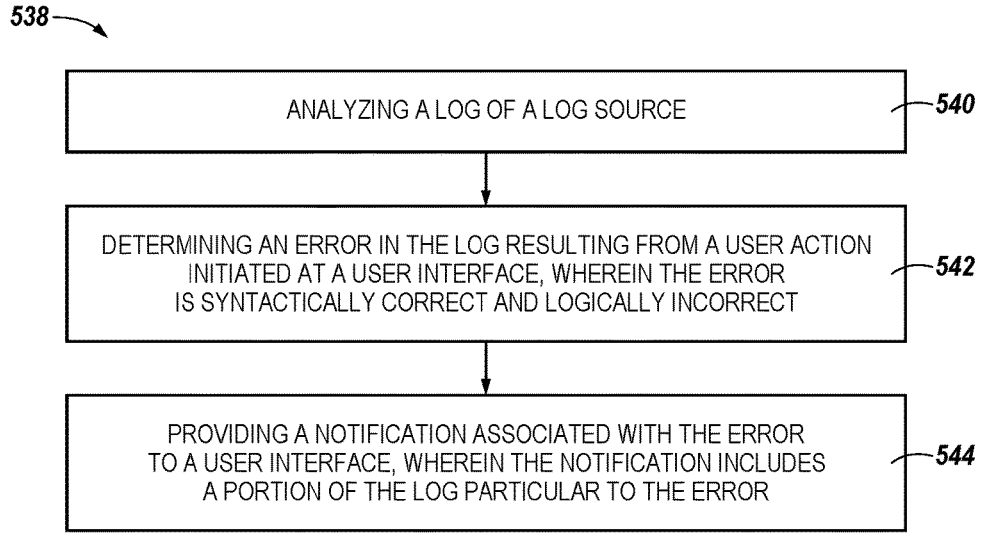
FIG. 5 is a flow chart illustrating a method for error determination from logs according to the present disclosure.

FIG. 5 is a flow chart illustrating a number of methods for determining errors from logs according to the present disclosure. At 540, the method 538 can include analyzing a log of a log source. At 542, the method 538 can include determining an error in the log resulting from a user action initiated at a user interface, wherein the error is syntactically correct and logically incorrect. At 544, the method 538 can include providing a notification associated with the error to a user interface, wherein the notification includes a portion of the log particular to the error.

Figure 6:
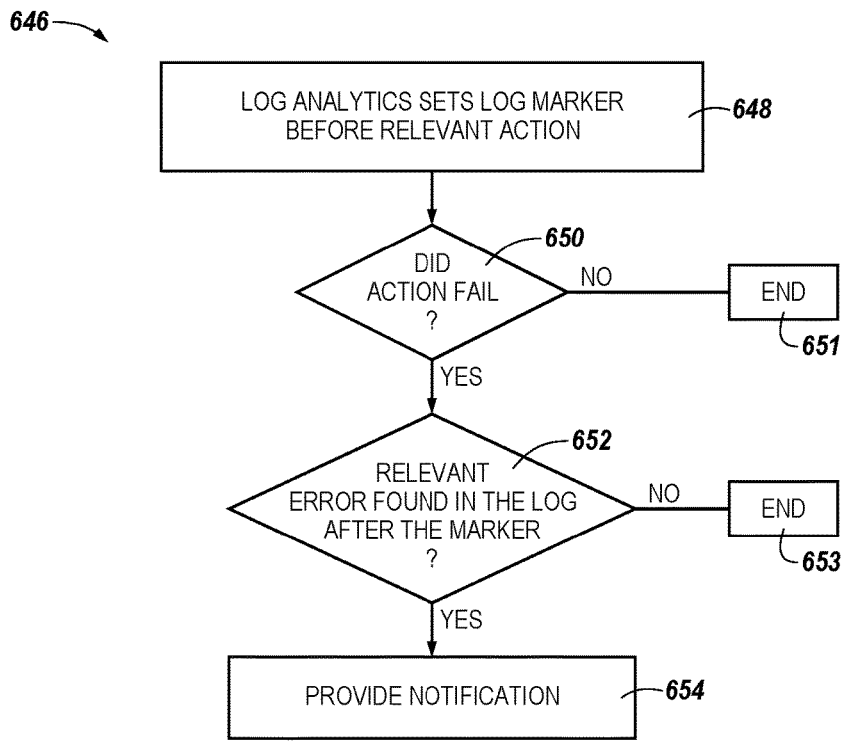
FIG. 6 is a flow chart associated with a process of error determination from logs according to the present disclosure.

FIG. 6 is a flow chart 646 associated with a process of error determination from logs according to the present disclosure. The flow chart 646 can represent a number of steps taken by a log analytics functionality as described herein, for instance. At 648, a log marker is set before a relevant action in the log. At 650, a determination is made regarding whether the action failed. If the action did not fail, the process can end at 651. If the action did fail, at 652 an analysis can be performed to determine whether a relevant error was found in the log after the marker. If no relevant error was found, the process can end at 653. If a relevant error was found, a notification can be provided at 654. The notification can include the relevant error, for instance. In some embodiments, when an action (e.g., a critical action) includes multiple steps, the log can be analyzed irrespective of a result of the action (e.g., whether the action failed or not). For example, even if an action succeeded, it may be critical enough for the log to be analyzed nonetheless.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium storing instructions executable by a processing resource to cause a computing system to:
   place a marker in a log of a log source indicating a user action with respect to the log source that set a verified state;
   analyze the log;
   determine an error in the log, the error resulting from:
      the user action; and
      an event occurring after the user action that impacted the verified state, rendering the verified state incorrect and causing the error; and
   provide a portion of the log associated with the error to a user interface.

2. The medium of claim 1, wherein the log source is an application, and wherein the instructions include instructions to place the marker in a memory of the application.

3. The medium of claim 1, wherein the error is a configuration error.

4. The medium of claim 1, wherein the user interface is particular to the log source.

5. The medium of claim 1, wherein the error is a non-fatal error.

6. The medium of claim 1, wherein the user interface is configured to allow configuration of the log source and a plurality of additional log sources.

7. A system, comprising:
a management server; and
a plurality of log sources coupled to the management server;
wherein the management server is configured to distribute a change to the plurality of log sources; and
wherein the plurality of log sources are each configured to:
 maintain a system log;
 place a marker in the system log indicating the change, wherein the change is logically correct at an initial time;
 analyze a portion of the system log after the marker in response to a non-fatal error caused by an event that occurred subsequent to the change rendering the change logically incorrect at a subsequent time; and
 send a relevant portion of the system log, based on the analysis, to the management server.

8. The system of claim 7, wherein the relevant portion of the log comprises a remainder of the system log after the marker.

9. The system of claim 7, wherein the relevant portion of the log comprises entries in the system log, after the marker, which are related to the error.

10. The system of claim 7, wherein the change is syntactically correct;
wherein the change is logically correct for a first subset of the plurality of log sources; and
wherein the change is logically incorrect for a second subset of the plurality of log sources, thereby causing the non-fatal error for the second subset of the plurality of log sources.

11. The system of claim 10, wherein each of the plurality of log sources being configured to analyze the portion of the system log comprise the plurality of log sources being configured to identify whether the change is logically incorrect for each of the plurality of log sources.

12. The system of claim 11, wherein the management server is configured to distribute a second change to the second subset of the plurality of log sources; and
wherein the second change is logically correct for the second subset of the plurality of log sources.

13. The system of claim 7, wherein the change is logically correct for a particular log source in an initial state; and
wherein the change is logically incorrect for the particular log source in a subsequent state.

14. A method, comprising:
analyzing a log of a log source;
determining an error in the log resulting from:
 a user action initiated at a user interface that set a verified state; and
 an event occurring after the user action that impacted the verified state, rendering the verified state syntactically correct and logically incorrect and causing the error; and
providing a notification associated with the error to a user interface, wherein the notification includes a portion of the log following a marker placed in the log indicating the user action.

15. The method of claim 14, wherein the user action includes an asynchronous operation deemed acceptable by the user interface of the management server, wherein the asynchronous operation fails at a later time causing the error.

16. The method of claim 14, wherein the user action involves a plurality of steps having at least one failed intermediate step causing the error.

17. The method of claim 14, wherein providing the notification associated with the error includes providing the notification in a message.

18. The method of claim 14, wherein providing the notification associated with the error includes providing the notification in an agent configuration page of the user interface.

* * * * *